United States Patent
Dayan et al.

(10) Patent No.: US 7,069,431 B2
(45) Date of Patent: Jun. 27, 2006

(54) RECOVERY OF A BIOS IMAGE

(75) Inventors: Richard Alan Dayan, Wake Forest, NC (US); Joseph Wayne Freeman, Raleigh, NC (US); William Fred Keown, Raleigh, NC (US); Randall Scott Springfield, Chapel Hill, NC (US)

(73) Assignee: Lenovo ( Singapore) Pte Ltd., Singapore (SG)

( * ) Notice: Subject to any disclaimer, the term of this patent is extended or adjusted under 35 U.S.C. 154(b) by 867 days.

(21) Appl. No.: 09/919,081

(22) Filed: Jul. 31, 2001

(65) Prior Publication Data

US 2003/0028800 A1    Feb. 6, 2003

(51) Int. Cl.
*H04L 9/32* (2006.01)
(52) U.S. Cl. .............................. 713/2; 726/26; 709/221
(58) Field of Classification Search ................ 713/1–2, 713/200; 709/222–223; 714/5–7, 15; 726/26
See application file for complete search history.

(56) References Cited

U.S. PATENT DOCUMENTS

| 5,410,699 | A | | 4/1995 | Bealkowski et al. | 395/700 |
| 5,579,522 | A | | 11/1996 | Christeson et al. | 395/652 |
| 5,864,698 | A | | 1/1999 | Krau et al. | 395/652 |
| 5,978,912 | A | * | 11/1999 | Rakavy et al. | 713/2 |
| 6,003,130 | A | * | 12/1999 | Anderson | 713/2 |
| 6,009,524 | A | * | 12/1999 | Olarig et al. | 713/200 |
| 6,122,733 | A | | 9/2000 | Christeson et al. | 713/2 |
| 6,185,696 | B1 | * | 2/2001 | Noll | 714/6 |
| 6,282,642 | B1 | * | 8/2001 | Cromer et al. | 713/2 |
| 6,282,643 | B1 | * | 8/2001 | Cromer et al. | 713/2 |
| 6,308,265 | B1 | * | 10/2001 | Miller | 713/2 |
| 6,438,640 | B1 | * | 8/2002 | Miyamoto et al. | 710/303 |
| 6,625,730 | B1 | * | 9/2003 | Angelo et al. | 713/2 |
| 6,647,494 | B1 | * | 11/2003 | Drews | 713/170 |
| 6,651,150 | B1 | * | 11/2003 | Maeda | 711/163 |
| 6,651,188 | B1 | * | 11/2003 | Harding et al. | 714/38 |
| 6,715,074 | B1 | * | 3/2004 | Chaiken | 713/164 |
| 6,715,106 | B1 | * | 3/2004 | Mermelstein | 714/36 |
| 6,718,464 | B1 | * | 4/2004 | Cromer et al. | 713/2 |
| 6,732,267 | B1 | * | 5/2004 | Wu et al. | 713/100 |
| 6,757,838 | B1 | * | 6/2004 | Chaiken et al. | 714/5 |
| 6,892,304 | B1 | * | 5/2005 | Galasso et al. | 713/189 |
| 2002/0147941 | A1 | * | 10/2002 | Gentile | 714/36 |

* cited by examiner

*Primary Examiner*—Emmanuel L. Moise
*Assistant Examiner*—Minh Dieu Nguyen
(74) *Attorney, Agent, or Firm*—Richard F. Frankeny; Winstead Sechrest & Minick P.C.

(57) ABSTRACT

A hard drive having a protected partition is used in the recovery of a BIOS image for a computer system. An EEPROM is used to store a first BIOS image that is used to boot-up the system and recovery code is used to recover a new BIOS image if the first BIOS image has been corrupted. The new BIOS image is stored in the protected partition of the drive. A recover BIOS command is issued whenever the first BIOS image has been corrupted or a remote or local recover BIOS request is received. When the first BIOS is corrupted, the EEPROM is rewritten with the second BIOS image and the system boots with the rewritten first BIOS image. When a recover BIOS request is received in a data packet sent over a communication link, the data packet is authenticated before the first BIOS image is rewritten.

67 Claims, 4 Drawing Sheets

RECOVERY OF A BIOS IMAGE

TECHNICAL FIELD

The present invention relates in general to recovering the Basic Input Output System (BIOS) image for a computer system upon a remote or local request or in the case of a boot-up failure.

BACKGROUND INFORMATION

The BIOS image, which includes both programs and data, is an essential set of routines in a personal computer (PC) or other computer system which is stored within the computer and provides an interface between the operating system and the hardware. The read-only locations in the BIOS image contain boot block code that is executed first after any power-up or system reset of the computer system. The BIOS image supports all peripheral technologies and internal services such as the real-time clock (time and date). On startup, code in the BIOS image (may be referred to as simply BIOS) tests the system and prepares the computer for operation by querying its own small memory bank for peripheral drive and other configuration settings. It searches for other BIOS images on the plug-in boards and sets up pointers (interrupt vectors) in memory to access those routines. It then loads the operating system and passes control to it. The BIOS accepts requests from the peripheral drivers as well as the application programs. The BIOS image must periodically be updated to keep pace with new peripheral technologies. If the BIOS image is stored in a read-only memory (ROM) chip (ROM BIOS), then to update the BIOS image the ROM chip must be replaced. In newer systems, the BIOS image is stored on an electronically erasable programmable read only memory (EEPROM) that may be upgraded via software. One problem with this method is that the BIOS in the EEPROM may be corrupted during the upgrade process. For example, corruption may occur if power is lost while updating the system BIOS image. To recover from the power loss, the covers of the system are opened and a jumper directs the receipt of a new BIOS image from an external storage device (e.g., a diskette). The diskette data is recorded into the EEPROM and then upon system re-boot the new BIOS image is used for setting up the system. The above method requires the system to be equipped with a diskette or other external readable storage media (e.g., CD-ROM) and it requires that the system covers be opened to manually direct (e.g., with a jumper) writing of the EEPROM with new BIOS image. Many new systems, while containing a hard drive, come without a diskette, CD-ROM, or other removable media drive. These systems which contain only a hard drive still require some method to recover a lost or corrupted BIOS image. It would be convenient to not require the opening of the covers of a system to update the stored BIOS image in an EEPROM, and it would be cost effective to eliminate nonessential storage devices incorporated in systems primarily for BIOS image recovery.

Therefore, there is a need for a method and system to allow the BIOS image to be recovered in a system with only a hard drive without requiring the covers of the system to be opened or requiring that the system be equipped with a diskette drive or a CD-ROM drive.

SUMMARY OF THE INVENTION

A computer system has an Integrated Drive Electronics (IDE) compatible hard drive storage device and a method for communicating with the system via either a wide area network (WAN) connection or a local area network (LAN). The IDE or equivalent hard drive is equipped with a feature that supports designations of partitions of the hard drive to be hidden and protected during the period when the operating system (OS) is in control and executing. The boot block code in the BIOS image stored in the EEPROM includes recovery code that searches the hidden partition of the hard drive for a BIOS image. The system manufacturer may place a recovery image in the hidden partition which then is used to recover the system in case the original BIOS image in the EEPROM is corrupted. If the active BIOS image in the EEPROM is corrupted, then on a recovery event, the boot block recovery code rewrites the BIOS image in the EEPROM with the BIOS image stored in the hidden portion of the hard drive. The BIOS image in the hidden partition of the hard drive may be updated via the external communication connection or in some instances from a diskette drive or a compact disk read-only memory (CD-ROM) drive.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
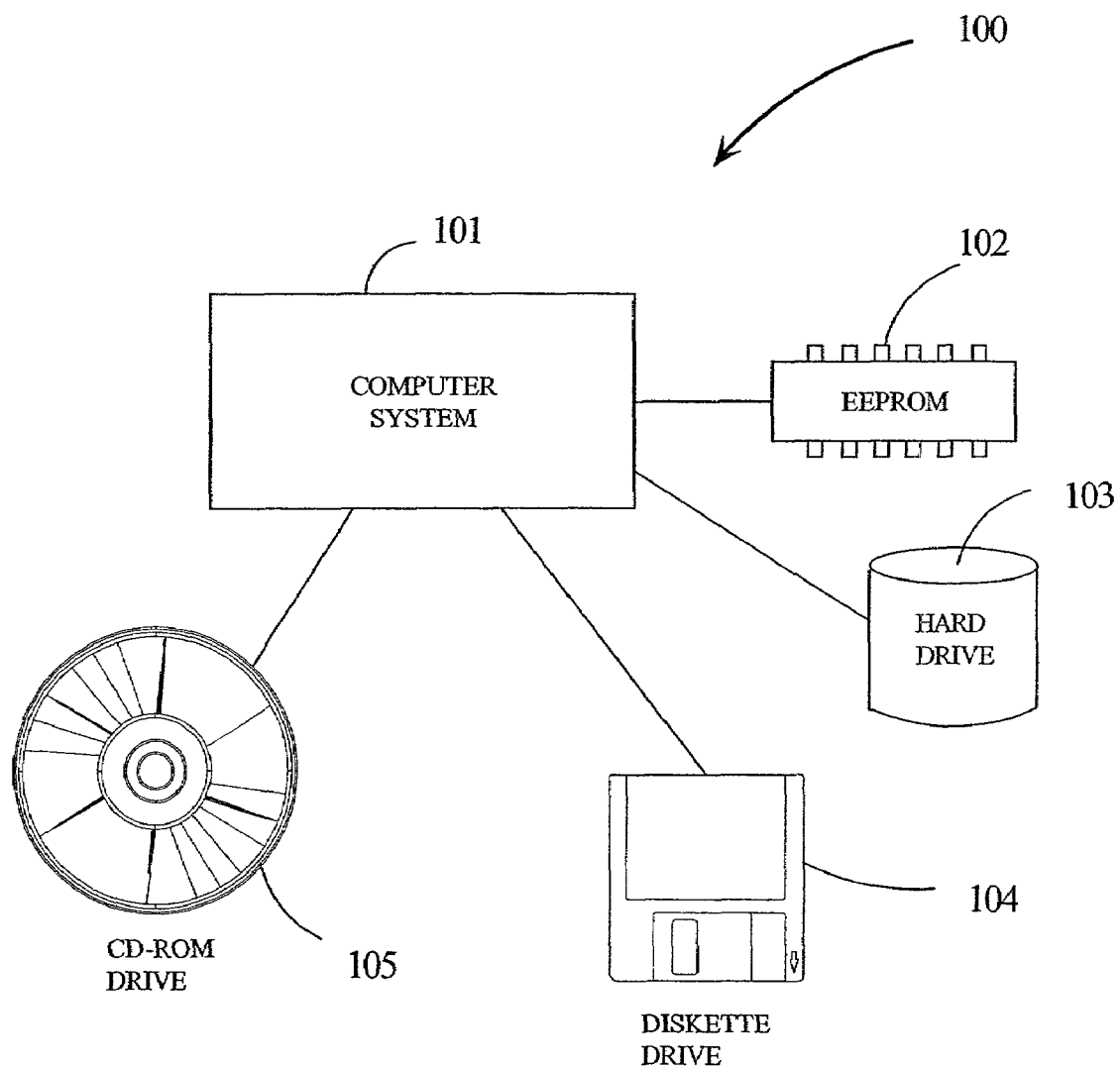
FIG. 1 is a block diagram of a computer with an EEPROM for storing a BIOS image and a CD-ROM or diskette drive for updating the BIOS image.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Integrated Drive Electronics (IDE) is a type of hardware interface widely used to connect hard disks, CD-ROMs and tape drives to a personal computer (PC). IDE, as an interface, is very popular because it is an economical way to connect peripherals. Starting out with 10 MB capacities years ago, 6 GB and 10 GB IDE hard disks have become entry level, costing less than a penny per megabyte. With IDE, the controller electronics is built into the drive itself, requiring a simpler circuit in the PC for connection. IDE drives were attached to earlier PCs using an IDE host adapter card. Today, two Enhanced IDE (EIDE) sockets are built onto the motherboard, and each socket connects to two devices via a 40-pin ribbon cable.

FIG. 1 is a block diagram of a computer system with an electronically erasable read-only memory (EEPROM) 102, a read/write magnetic disk storage (hard drive) 103, a diskette drive 104 for diskette media, and a compact disk read-only memory (CD-ROM) drive 105. The hard drive 103 and the diskette drive 104 may be used to store data and programs for the computer system. CD-ROM 105 is typically used for loading programs or other data into computer system 101. EEPROM 102 may be used to store a BIOS image used by computer system 101 during boot-up to set the proper states of various I/O devices and hardware within computer 101. If the BIOS for computer system 101 gets corrupted, a diskette or CD-ROM may be used to update the BIOS image in EEPROM 102. Since the computer system 101 would typically read BIOS information from EEPROM 102 during a re-boot, a wire jumper is sometimes used to switch computer system 101 to store a new BIOS image from diskette drive 104 or CD-ROM drive 105 in EEPROM 102 for future re-boot operations. To change a wire jumper connection for this operation typically requires removing the covers of computer system 101.

Figure 2:
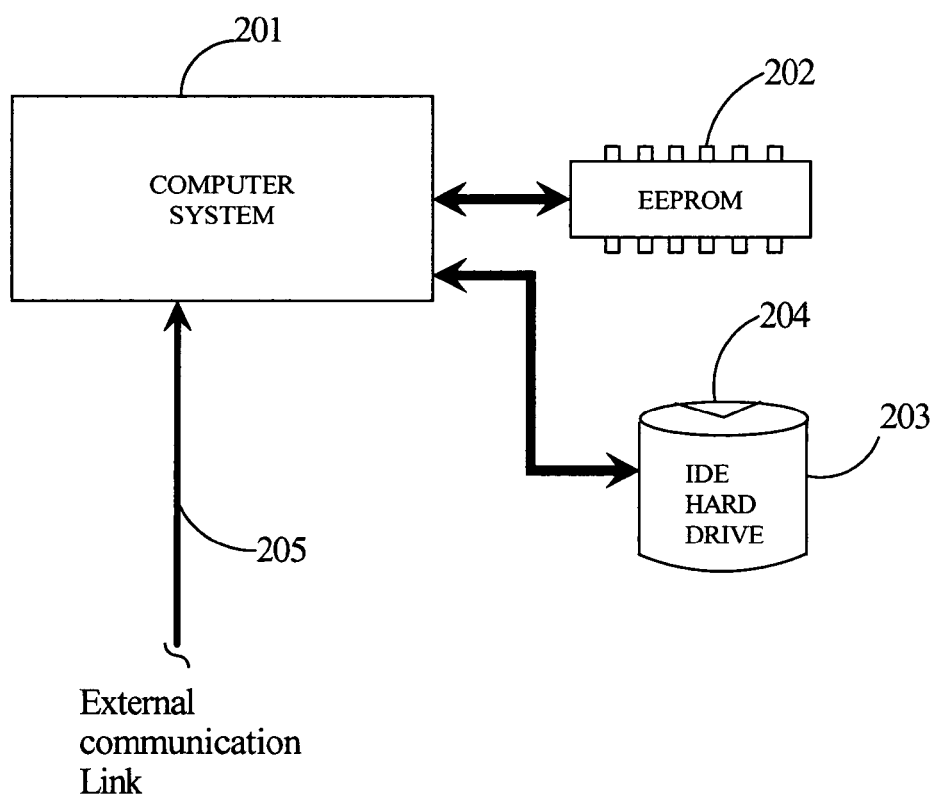
FIG. 2 is a block diagram of a computer system according to embodiments of the present invention.

FIG. 2 is a block diagram of computer system 201 without a CD-ROM drive or a diskette drive 104. System 201, in this embodiment of the present invention, uses an external connection 205 to allow a new BIOS image to be loaded from a hidden partition 204 on IDE hard drive 203. A normal re-boot or recovery of the BIOS image accesses EEPROM 202. However, if the BIOS image in the EEPROM 202 has been corrupted, then a normal re-boot would fail. A re-boot normally occurs as the result of a power-up instigated locally at the system or via a remote link. The system supports the "Wake on LAN" (WOL) protocol for remotely requesting a power-up of the system. When a power-up occurs, the boot block code accesses registers to determine the source of the power-up command. In this way, the boot block code may start a recovery process where the BIOS image in the EEPROM 202 is checked for validity. If the BIOS image in EEPROM 202 is corrupt, then the new BIOS image in the hidden partition 204 is checked for validity. If the new BIOS image is valid, it is written into EEPROM 202 in place of the existing BIOS image. If the boot block code determines that a WOL was used to issue a system power-up, then it instigates a BIOS recovery process if the WOL is properly authenticated. EEPROM 202 has recovery code that verifies the WOL packet against a known signature. If the WOL is authenticated, then the present BIOS image EEPROM 202 may be rewritten with the new BIOS image from the hidden partition 204 on hard drive 203 and system may re-boot using the BIOS image from EEPROM 202.

Figure 3:
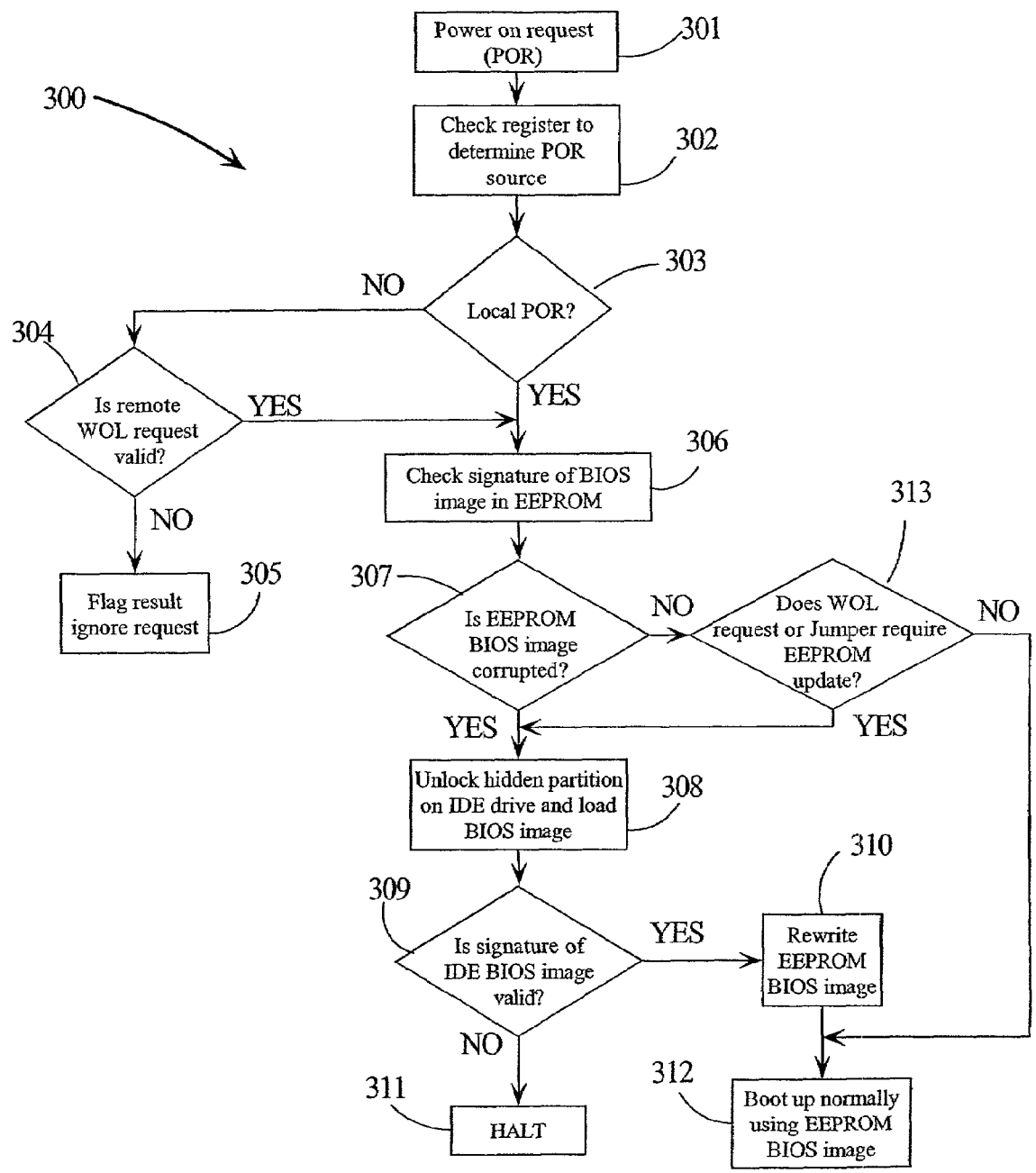
FIG. 3 is a flow diagram of steps in a method according to embodiments of the present invention.

FIG. 3 is a flow diagram of method steps in an embodiment of the present invention. In step 301, a power on request (POR) is received. In step 302, a register in system 201 is checked to determine the source of the POR. A test is done in step 303 to determine if the POR request is the result of a local POR in system 201. If the result of the test in step 303 is NO, then a test is done in step 304 to determine if the remote request via external communication link 205 request is valid. Communication over external communication link 205 may be secured by a variety of techniques which enable the boot block code to determine if the remote request is valid. If the result of the test in step 304 is NO, then an invalid request is Flagged and the request is ignored in step 305. If the result of the test in step 304 is YES, then the signature (e.g., a check sum) of the BIOS image is validated in step 306 to determine if the EEPROM 202 BIOS image has been corrupted. If the result of the test in step 307 is NO, then in step 313 a test is done to determine if the WOL request still requires that the BIOS in EEPROM 202 be updated or the jumper has been set to force an update in the case of a local POR. If the result of the test in step 313 is NO, then in step 312 a normal boot-up is executed using the present EEPROM BIOS 202 image. If the result of the test in step 313 is YES, then in step 308, the hidden partition 204 of IDE drive 203 is unlocked by the boot block code and the new BIOS image is loaded. If the result of the test in step 307 is YES, then the present EEPROM 202 BIOS image has been corrupted and a new BIOS image needs to be used for boot-up. In this case, step 308 is executed as before. In step 309, the signature of the new BIOS image in EEPROM 202 is checked to determine if the new BIOS image is valid. If the result of the test in step 309 is NO, then the boot-up is Halted as there is no valid BIOS image to boot-up the system. If the result of the test in step 309 is YES, then in step 310 the new BIOS image is written into EEPROM 202. In step 312, the system is booted up normally using the new BIOS image written into EEPROM 202.

Figure 4:
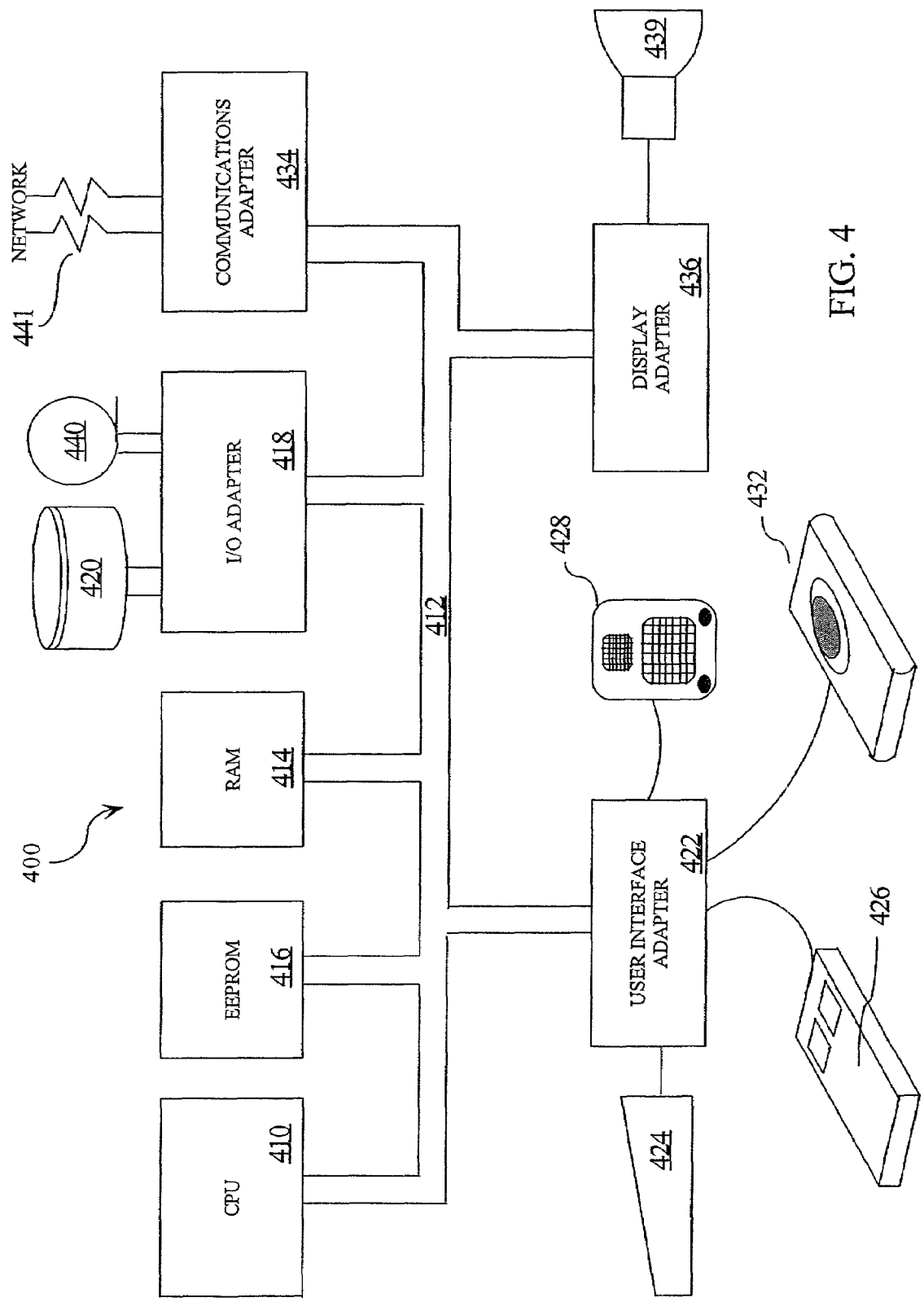
FIG. 4 is a data processing system configured to use embodiments of the present invention for recovering or updating the BIOS image.

FIG. 4 is a high level functional block diagram of a representative data processing system 400 suitable for practicing the principles of the present invention. Data processing system 400, includes a central processing system (CPU) 410 operating in conjunction with a system bus 412. System bus 412 operates in accordance with a standard bus protocol, such that as the ISA protocol, compatible with CPU 410. CPU 410 operates in conjunction with electronically erasable programmable read-only memory (EEPROM) 416 and random access memory (RAM) 414. Among other things, EEPROM 416 supports storage for the Basic Input Output System (BIOS) data and recovery code. RAM 414 includes, DRAM (Dynamic Random Access Memory) system memory and SRAM (Static Random Access Memory) external cache. I/O Adapter 418 allows for an interconnection between the devices on system bus 412 and external peripherals, such as mass storage devices (e.g., an IDE hard drive, floppy drive or CD/ROM drive), or a printer 440. A peripheral device 420 is, for example, coupled to a peripheral control interface (PCI) bus, and I/O adapter 418 therefore may be a PCI bus bridge. User interface adapter 422 couples various user input devices, such as a keyboard 424, mouse 426, touch pad 432 or speaker 428 to the processing devices on bus 412. Display 439 which may be, for example, a cathode ray tube (CRT), liquid crystal display (LCD) or similar conventional display units. Display adapter 436 may include, among other things, a conventional display controller and frame buffer memory. Data processing system 400 may be selectively coupled to a computer or telecommunications network 441 through communications adapter 434. Communications adapter 434 may include, for example, a modem for connection to a telecom network and/or hardware and software for connecting to a computer network such as a local area network (LAN) or a wide area network (WAN). CPU 410 may be a processor system employing the recovery of a BIOS image according to embodiments of the present invention. CPU 410 may also be operable to execute instructions implementing method steps according to embodiments of the present invention.

Although the present invention and its advantages have been described in detail, it should be understood that various changes, substitutions and alterations can be made herein without departing from the spirit and scope of the invention as defined by the appended claims.

What is claimed is:

1. A method for recovering a Basic Input Output System (BIOS) image in a computer system, comprising the steps of:

executing recovery code stored in a nonvolatile memory in response to a recover BIOS command;

rewriting a first BIOS image in said nonvolatile memory with a second BIOS image stored in a protected portion of a nonvolatile storage unit in response to said recovery code; and updating said system using said rewritten second BIOS image in said nonvolatile memory, wherein said first BIOS image is rewritten with said second BIOS image if said first BIOS image is determined to be corrupted and wherein said first BIOS image is determined to be corrupted by comparing a signature of said first BIOS image to a signature received in a secure data packet.

2. The method of claim 1, wherein said recover BIOS command is generated in response to a recover BIOS request received by said computer system over a communication link.

3. The method of claim 2, wherein said recover BIOS request is part of a secure data packet received by said computer system via said communication link.

4. The method of claim 3, wherein said secure data packet has data which must first be authenticated by said recovery code before said first BIOS image is rewritten with said second BIOS image.

5. The method of claim 3, wherein said secure data packet is a Wake on LAN packet.

6. The method of claim 1, wherein said nonvolatile memory is an electronically erasable programmable read only memory (EEPROM).

7. The method of claim 1, wherein said communication link comprises a local area network (LAN) and a wide area network (WAN).

8. The method of claim 1, wherein said nonvolatile storage unit is an integrated drive electronics (IDE) disc drive.

9. The method of claim 1, wherein said second BIOS image was written onto said protected partition of said nonvolatile storage unit at the time of manufacture.

10. The method of claim 1 wherein said second BIOS image is written onto said protected partition of said nonvolatile storage unit under control of an operating system executing an update BIOS image program on said system.

11. An apparatus for recovering a BIOS image for a computer system comprising:

a nonvolatile memory for storing recovery code and a first BIOS image;

a nonvolatile read/write storage system having a protectable storage partition, said partition storing a second BIOS image;

an execution unit to execute said recovery code stored in said nonvolatile memory in response to a recover BIOS command;

a write circuit for rewriting said first BIOS image in said nonvolatile memory with said second BIOS image stored in said protected partition of said nonvolatile storage unit in response to said recovery code; and an update circuit for booting up said system using said second BIOS image written in said nonvolatile memory, wherein said first BIOS image is rewritten with said second BIOS image if said first BIOS image is determined to be corrupted and wherein said first BIOS image is determined to be corrupted by comparing a signature of said first BIOS image to a signature received in a secure data packet.

12. The apparatus of claim 11 further comprising a receiver circuit to receive a recover BIOS request via a communication link.

13. The apparatus of claim 12, wherein said recover BIOS command is generated in response to said recover BIOS request received by said receiver circuit over said communication link.

14. The apparatus of claim 12, wherein said communication link comprises a local area network (LAN) and a wide area network (WAN).

15. The apparatus of claim 13, wherein said recover BIOS request is part of a secure data packet received via said communication link.

16. The apparatus of claim 15, wherein said secure data packet has data which must be first authenticated by said recovery code before said first BIOS image is rewritten with said second BIOS image.

17. The apparatus of claim 15, wherein said secure data packet is a Wake on LAN packet.

18. The apparatus of claim 11, wherein said nonvolatile memory is an electronically erasable programmable read only memory (EEPROM).

19. The apparatus of claim 11, wherein said nonvolatile storage unit is an integrated drive electronics (IDE) disc drive.

20. The apparatus of claim 11, wherein said second BIOS image was written onto said protected partition of said nonvolatile storage unit at the time of manufacture.

21. A data processing system comprising:

a central processing unit (CPU);

a random access memory (RAM);

a communications adapter coupled to a communication link;

an I/O adapter coupled to non volatile read/write storage system, said nonvolatile read/write storage system (hard drive) having a protectable storage partition, said partition storing a second BIOS image;

a nonvolatile electronically erasable programmable read only memory (EEPROM); and a bus system coupling said CPU to said EEPROM, said communications adapter, said I/O adapter, and said RAM, wherein said CPU comprises;

circuitry for executing said recovery code stored in a nonvolatile memory in response to a recover BIOS command;

circuitry for rewriting said first BIOS image stored in said nonvolatile memory with said second BIOS image stored in said protected partition of said nonvolatile storage unit in response to said recovery code; and circuitry for booting up said system using said second BIOS image written in said nonvolatile memory, wherein said first BIOS image is rewritten with said second BIOS image if said first BIOS image is determined to be corrupted and wherein said first BIOS image is determined to be corrupted by comparing a signature of said first BIOS image to a signature received in a secure data packet.

22. The data processing system of claim 21 further comprising a receiver circuit to receive a recover BIOS request via a communication link.

23. The data processing system of claim 22, wherein said recover BIOS command is generated in response to said recover BIOS request received by said receiver circuit over said communication link.

24. The data processing system of claim 23, wherein said secure data packet is a Wake on LAN packet.

25. The data processing system of claim 21, wherein said recover BIOS request is part of a secure data packet received via said communication link.

26. The data processing system of claim 25, wherein said secure data packet has data which must be first authenticated by said recovery code before said first BIOS image is rewritten with said second BIOS image.

27. The data processing system of claim 21, wherein said nonvolatile memory is an electronically erasable programmable read only memory (EEPROM).

28. The data processing system of claim 21, wherein said communication link comprises a local area network (LAN) and a wide area network (WAN).

29. The data processing system of claim 21, wherein said nonvolatile storage unit is an integrated drive electronics (IDE) disc drive.

30. The data processing system of claim 21, wherein said second BIOS image is written onto said protected partition of said nonvolatile storage unit at the time of manufacture.

31. The data processing system of claim 21, wherein said second BIOS image is written onto said protected partition of said nonvolatile storage unit under control of an operating system executing an update BIOS image program on said system.

32. A computer program product for recovering a BIOS image for a computer system, said computer program product embodied in a machine readable medium, including programming for a processor, said computer program comprising a program of instructions for performing the program steps of:
    executing recovery code stored in a nonvolatile memory in response to a recover BIOS command;
    rewriting a first BIOS image in said nonvolatile memory with a second BIOS image stored in a protected portion of a nonvolatile storage unit in response to said recovery code; and
    updating said system using said rewritten second BIOS image in said nonvolatile memory, wherein said first BIOS image is rewritten with said second BIOS image if said first BIOS image is determined to be corrupted and wherein said first BIOS image is determined to be corrupted by comparing a signature of said first BIOS image to a signature received in a secure data packet.

33. The computer program product of claim 32, wherein said recover BIOS command is generated in response to a recover BIOS request received by said computer system over a communication link.

34. The computer program product of claim 33, wherein said recover BIOS request is part of a secure data packet received by said computer system via said communication link.

35. The computer program product of claim 34, wherein said secure data packet has data which must first be authenticated by said recovery code before said first BIOS image is rewritten with said second BIOS image.

36. The computer program product of claim 34, wherein said secure data packet is a Wake on LAN packet.

37. The computer program product of claim 32, wherein said nonvolatile memory is an electronically erasable programmable read only memory (EEPROM).

38. The computer program product of claim 32, wherein said communication link comprises a local area network (LAN) and a wide area network (WAN).

39. The computer program product of claim 32, wherein said nonvolatile storage unit is an integrated drive electronics (IDE) disc drive.

40. The computer program product of claim 32, wherein said second BIOS image was written onto said protected partition of said nonvolatile storage unit at the time of manufacture.

41. The computer program product of claim 32, wherein said second BIOS image is written onto said protected partition of said nonvolatile storage unit under control of an operating system executing an update BIOS image program on said system.

42. A method for recovering a Basic Input Output System (BIOS) image in a computer system, comprising the steps of:
    executing recovery code stored in a nonvolatile memory in response to a recover BIOS command;
    rewriting a first BIOS image in said nonvolatile memory with a second BIOS image stored in a protected portion of a nonvolatile storage unit in response to said recovery code; and
    updating said system using said rewritten second BIOS image in said nonvolatile memory,
    wherein said recover BIOS command is generated in response to a recover BIOS request received by said computer system over a communication link, said recover BIOS request is part of a secure data packet received by said computer system via said communication link, and said secure data packet has data which must first be authenticated by said recovery code before said first BIOS image is rewritten with said second BIOS image.

43. The method of claim 42, wherein said first BIOS image is rewritten with said second BIOS image if said first BIOS image is determined to be corrupted.

44. The method of claim 42, wherein said nonvolatile memory is an electronically erasable programmable read only memory (EEPROM).

45. The method of claim 42, wherein said communication link comprises a local area network (LAN) and a wide area network (WAN).

46. The method of claim 42, wherein said nonvolatile storage unit is an integrated drive electronics (IDE) disc drive.

47. The method of claim 42, wherein said second BIOS image was written onto said protected partition of said nonvolatile storage unit at the time of manufacture.

48. An apparatus for recovering a BIOS image for a computer system comprising:
    a nonvolatile memory for storing recovery code and a first BIOS image;
    a nonvolatile read/write storage system having a protectable storage partition, said partition storing a second BIOS image;
    an execution unit to execute said recovery code stored in said nonvolatile memory in response to a recover BIOS command;
    a write circuit for rewriting said first BIOS image in said nonvolatile memory with said second BIOS image stored in said protected partition of said nonvolatile storage unit in response to said recovery code;

an update circuit for booting up said system using said second BIOS image written in said nonvolatile memory; and a receiver circuit to receive a recover BIOS request via a communication link, wherein said first BIOS image is rewritten with said second BIOS image if said first BIOS image is determined to be corrupted, said recover BIOS command is generated in response to said recover BIOS request received by said receiver circuit over said communication link, said recover BIOS request is part of a secure data packet received via said communication link, and said secure data packet has data which must be first authenticated by said recovery code before said first BIOS image is rewritten with said second BIOS image.

49. The apparatus of claim 48, wherein said nonvolatile memory is an electronically erasable programmable read only memory (EEPROM).

50. The apparatus of claim 48, wherein said communication link comprises a local area network (LAN) and a wide area network (WAN).

51. The apparatus of claim 48, wherein said nonvolatile storage unit is an integrated drive electronics (IDE) disc drive.

52. The apparatus of claim 48, wherein said second BIOS image was written onto said protected partition of said nonvolatile storage unit at the time of manufacture.

53. An apparatus for recovering a BIOS image for a computer system comprising:

a nonvolatile memory for storing recovery code and a first BIOS image;

a nonvolatile read/write storage system having a protectable storage partition, said partition storing a second BIOS image;

an execution unit to execute said recovery code stored in said nonvolatile memory in response to a recover BIOS command;

a write circuit for rewriting said first BIOS image in said nonvolatile memory with said second BIOS image stored in said protected partition of said nonvolatile storage unit in response to said recovery code; and an update circuit for booting up said system using said second BIOS image written in said nonvolatile memory, wherein said first BIOS image is rewritten with said second BIOS image if said first BIOS image is determined to be corrupted, said recover BIOS request is part of a secure data packet received via said communication link, and said secure data packet has data which must be first authenticated by said recovery code before said first BIOS image is rewritten with said second BIOS image.

54. The data processing system of claim 53 further comprising a receiver circuit to receive a recover BIOS request via a communication link.

55. The data processing system of claim 53, wherein said recover BIOS command is generated in response to said recover BIOS request received by said receiver circuit over said communication link.

56. The data processing system of claim 53, wherein said nonvolatile memory is an electronically erasable programmable read only memory (EEPROM).

57. The data processing system of claim 53, wherein said communication link comprises a local area network (LAN) and a wide area network (WAN).

58. The data processing system of claim 53, wherein said nonvolatile storage unit is an integrated drive electronics (IDE) disc drive.

59. The data processing system of claim 53, wherein said second BIOS image is written onto said protected partition of said nonvolatile storage unit at the time of manufacture.

60. A computer program product for recovering a BIOS image for a computer system, said computer program product embodied in a machine readable medium, including programming for a processor, said computer program comprising a program of instructions for performing the program steps of:

executing recovery code stored in a nonvolatile memory in response to a recover BIOS command;

rewriting a first BIOS image in said nonvolatile memory with a second BIOS image stored in a protected portion of a nonvolatile storage unit in response to said recovery code; and updating said system using said rewritten second BIOS image in said nonvolatile memory, wherein said recover BIOS command is generated in response to a recover BIOS request received by said computer system over a communication link, said recover BIOS request is part of a secure data packet received by said computer system via said communication link, and said secure data packet has data which must first be authenticated by said recovery code before said first BIOS image is rewritten with said second BIOS image.

61. The computer program product of claim 60, wherein said first BIOS image is rewritten with said second BIOS image if said first BIOS image is determined to be corrupted.

62. The computer program product of claim 60, wherein said nonvolatile memory is an electronically erasable programmable read only memory (EEPROM).

63. The computer program product of claim 60, wherein said communication link comprises a local area network (LAN) and a wide area network (WAN).

64. The computer program product of claim 60, wherein said nonvolatile storage unit is an integrated drive electronics (IDE) disc drive.

65. The computer program product of claim 60, wherein said second BIOS image was written onto said protected partition of said nonvolatile storage unit at the time of manufacture.

66. The computer program product of claim 60, wherein said secure data packet is a Wake on LAN packet.

67. The computer program product of claim 60, wherein said second BIOS image is written onto said protected partition of said nonvolatile storage unit under control of an operating system executing an update BIOS image program on said system.

* * * * *